(12) United States Patent
Zoldi et al.

(10) Patent No.: US 7,945,515 B2
(45) Date of Patent: *May 17, 2011

(54) MASS COMPROMISE/POINT OF COMPROMISE ANALYTIC DETECTION AND COMPROMISED CARD PORTFOLIO MANAGEMENT SYSTEM

(75) Inventors: Scott M. Zoldi, San Diego, CA (US); Liang Wang, San Diego, CA (US); Li Sun, San Diego, CA (US); Steven G. Wu, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/838,303

(22) Filed: Jul. 16, 2010

(65) Prior Publication Data

US 2010/0280943 A1  Nov. 4, 2010

Related U.S. Application Data

(63) Continuation of application No. 11/475,722, filed on Jun. 26, 2006, now Pat. No. 7,761,379.

(60) Provisional application No. 60/693,728, filed on Jun. 24, 2005.

(51) Int. Cl.
*G06Q 40/00* (2006.01)
(52) U.S. Cl. .......................................................... 705/44
(58) Field of Classification Search ................ 705/35–45
See application file for complete search history.

(56) References Cited

U.S. PATENT DOCUMENTS

| 6,018,723 A | * | 1/2000 | Siegel et al. | ..................... 705/38 |
| 6,094,643 A | * | 7/2000 | Anderson et al. | ............... 705/44 |
| 7,376,618 B1 | * | 5/2008 | Anderson et al. | ............... 705/38 |

* cited by examiner

*Primary Examiner* — Hani Kazimi
*Assistant Examiner* — Clifford Madamba
(74) *Attorney, Agent, or Firm* — Mintz, Levin, Cohn, Ferris, Glovsky and Popeo, P.C.

(57) ABSTRACT

A system and method for managing mass compromise of financial transaction devices is disclosed. A method includes maintaining a summary of a transaction history for a financial transaction device, and forming a device history profile based on the transaction history, the device history profile including predictive variables indicative of fraud associated with the financial transaction device. A method further includes generating a fraud score based on the predictive variables, the fraud score representing a likelihood that the financial transaction device is compromised will be used fraudulently.

18 Claims, 6 Drawing Sheets

100

| Suspicious MOTO Variables | Suspicious Counterfeit Variables | CCGP Index | Compromise Cluster(s) | Tagged Variables |
|---|---|---|---|---|

| Suspicious MOTO Variables | Suspicious Counterfeit Variables | CCGP Index | Compromise Cluster(s) | Tagged Variables |

| Account Number | Date-Time[1] : | CMGP Index[1] : | Previous CCGP Index[1] | Next CCGP Index[1] |
|---|---|---|---|---|
| | Date-Time[2] : | CMGP Index[2] : | Previous CCGP Index[2] | Next CCGP Index[2] |
| | Date-Time[3] : | CMGP Index[3] : | Previous CCGP Index[3] | Next CCGP Index[3] |
| | ... | ... | ... | ... |
| | Date-Time[N] | CMGP Index[N] : | Previous CCGP Index[N] | Next CCGP Index[N] |

FIG. 2

| Suspicious MOTO Variables | Suspicious merchant fraud variables | CMGP Index | Etc.... |

FIG. 3

| Date-Time[1] | # Cards : | #Counterfeit Fraud | # Suspected Counterfeit | # Moto Fraud | # Suspected MOTO | Testing/Rejects Etc... | Last CCGP Index to Update |
|---|---|---|---|---|---|---|---|
| Date-Time[2] | # Cards : | #Counterfeit Fraud | # Suspected Counterfeit | # Moto Fraud | # Suspected MOTO | Testing/Rejects Etc... | Last CCGP Index to Update |
| ... | ... | ... | ... | ... | ... | ... | ... |
| Date-Time[180]: | # Cards : | #Counterfeit Fraud | # Suspected Counterfeit | # Moto Fraud | # Suspected MOTO | Testing/Rejects Etc... | Last CCGP Index to Update |
| Week[1] | # Cards : | #Counterfeit Fraud | # Suspected Counterfeit | # Moto Fraud | # Suspected MOTO | Testing/Rejects Etc... | Last CCGP Index to Update |
| Week[2] | # Cards : | #Counterfeit Fraud | # Suspected Counterfeit | # Moto Fraud | # Suspected MOTO | Testing/Rejects Etc... | Last CCGP Index to Update |
| ... | ... | ... | ... | ... | ... | ... | ... |
| Week[104] | # Cards : | #Counterfeit Fraud | # Suspected Counterfeit | # Moto Fraud | # Suspected MOTO | Testing/Rejects Etc... | Last CCGP Index to Update |

FIG. 4

| Volumetric and Acceleration in Test site usage | Volumetric and Acceleration in MOTO usage | Proportion and acceleration in proportion of fraud reporting | Etc... |

1st transaction:

| Card #121321 | Last CCGP_index = NONE | Future CCGP_index = NONE | Etc... |
|---|---|---|---|
| Merchant #34138 | Last CCGP_index = Card #121321 | | |

FIG. 6B

2nd transaction:

| Card #121321 | Last CCGP_index = NONE | Future CCGP_index = #44312231 | Etc... |
|---|---|---|---|
| Card #44312231 | Last CCGP_index = #121321 | Future CCGP_index = NONE | Etc... |
| Merchant #34138 | Last CCGP_index = Card #44312231 | | |

FIG. 6C

3rd transaction:

| Card #44312231 | Last CCGP_index = #121321 | Future CCGP_index = #88129219 | Etc... |
|---|---|---|---|
| Card #88129219 | Last CCGP_index = #44312231 | Future CCGP_index = NONE | Etc... |
| Merchant #34138 | Last CCGP_index = Card #88129219 | | |

FIG. 6D

Removal of Transaction linking Card #121321

| Card #44312231 | Last CCGP_index = #90129081 | Future CCGP_index = #121321 | Etc... |
|---|---|---|---|
| Card #121321 | Last CCGP_index = #44312231 | Future CCGP_index = #8129891 | Etc... |
| Card #8129891 | Last CCGP_index = #121321 | Future CCGP_index = #212182 | Etc... |

FIG. 6E

Link-list Repaired

| Card #44312231 | Last CCGP_index = #90129081 | Future CCGP_index = #8129891 | Etc... |
|---|---|---|---|
| ~~Card #121321~~ | | | |
| Card #8129891 | Last CCGP_index = #44312231 | Future CCGP_index = #212182 | Etc... |

MASS COMPROMISE/POINT OF COMPROMISE ANALYTIC DETECTION AND COMPROMISED CARD PORTFOLIO MANAGEMENT SYSTEM

CROSS REFERENCE TO RELATED APPLICATIONS

This application is a continuation and claims the benefit of priority under 35 U.S.C. §120 of U.S. patent application Ser. No. 11/475,722, filed Jun. 26, 2006 now U.S. Pat. No. 7,761,379, entitled "MASS COMPROMISE/POINT OF COMPROMISE ANALYTIC DETECTION AND COMPROMISED CARD PORTFOLIO MANAGEMENT SYSTEM", which claims priority under 35 U.S.C. §119 to U.S. Provisional Application Ser. No. 60/693,728, filed Jun. 24, 2005, entitled "MASS COMPROMISE/POINT OF COMPROMISE ANALYTIC DETECTION AND COMPROMISED CARD PORTFOLIO MANAGEMENT SYSTEM", which the disclosure of which is incorporated herein by reference.

BACKGROUND

Modern economies increasingly depend on a variety of user devices that facilitate financial transactions, or the exchange of legal tender for goods or services. Prominent among these devices are credit cards and debit cards. These cards include numerical information such as an account number representing a user's credit or banking account, as well as textual information that may indicate, as an example, the identity of the user, the identity of the creditor or banker entity. Other devices used for facilitating financial transactions include wireless handheld devices, which may store such numerical and textual information in the device's memory, and transmit such information at the point of sale to execute the financial transaction.

A problem with the above financial transaction devices is that their numerical and/or textual information may be easily compromised, that is, easily obtained by an unauthorized third party (i.e. fraudsters). Once compromised, the third party may execute a number of unauthorized and highly damaging financial transactions, and often go undetected for a long period of time. Further damaging is that often financial devices are compromised in mass leading to mistrust in the financial network and huge financial losses for the financial institutions that utilize these devices.

SUMMARY

This document discloses a financial transaction device management system and method. In some implementations, a system and method are employed for predicting or detecting, and then managing the mass compromise of financial' transaction devices to prevent continued fraud.

In one aspect, a computer-implemented method includes maintaining a summary of a transaction history for a financial transaction device, and forming a device history profile based on the transaction history, the device history profile including predictive variables indicative of fraud associated with the financial transaction device. The method further includes generating a fraud score based on the predictive variables, the fraud score representing a likelihood that the financial transaction device is compromised and will be used fraudulently.

In another aspect, a computer-implemented method includes the steps of forming a device profile associated with a financial transaction device and based on a transaction history, the device profile including predictive variables that are indicative of a fraud. The method further includes the steps of generating a fraud score based on the predictive variables, the fraud score representing a likelihood that the financial transaction device is compromised, and based on predictive variables, determining whether the financial transaction device will be used fraudulently in the near future.

In yet another aspect, a system for managing compromise of financial transaction devices includes a transaction history for a financial transaction device, and a compromise device global profile associated with the transaction history, the device global profile including predictive variables indicative of fraud. The system further includes a fraud score based on the predictive variables, the fraud score representing a likelihood the financial transaction device is compromised will be used fraudulently.

BRIEF DESCRIPTION OF THE DRAWINGS

These and other aspects will now be described in detail with reference to the following drawings.

FIG. 1 is a representation of a card profile.
FIG. 2 is a representation of a card global profile.
FIG. 3 is a representation of a merchant profile.
FIG. 4 is a representation of a merchant global profile.
FIG. 5 is a representation of a compromise cluster profile.
FIG. 6A-6C depict an updated two-way linked list with sequential transactions at the same merchant on the same date.
FIG. 6D-6E depict profile manipulations to repair a two-way linked list between cards used with the same merchant on the same date when a transaction is aged off the transaction history for an exemplary card #121321.

DETAILED DESCRIPTION

This document describes a system for detecting and managing compromises of financial transaction devices, including credit cards, debit cards, wireless transmission devices, or other devices (herein referred to generally as "cards"), embodied as a real-time mass compromise/point compromise detection and compromised card portfolio management system and method. In addition to detecting potential mass compromise/point of compromise, the system and method are configured to monitor fraud activity of a compromised card cluster to produce compromise fraud scores at the cluster and/or card level which indicates the probability of the compromised card to be used fraudulently.

In some variations, the system and method include a globally nested, two-way linked-list system that allows for accurate determination of compromises and provides the appropriate linked lists to associate compromised cards with the compromise. The system or method utilizes complex profile management techniques to update and maintain the two-way linked lists in real-time, and to spontaneously create compromise portfolio card clusters and monitor the activity of the compromised cards in analytic-generated compromise portfolios. In some particular implementations, the system or method includes a real-time scoring architecture producing scores at the card-level, merchant-level, and compromise portfolio level. The real-time scoring architecture is configured to detect the mass compromise/point of compromise, and a compromise card score is computed to manage the associated compromised card portfolios.

The system and method, as described in its various alternatives below, detects mass compromise and point of compromise through pre-fraud patterns in time, fraud activity variables, and through intense testing of cards at test sites, creates a compromise portfolio. The system also maintains two-way linked lists of cards visiting merchants, and can autonomously repair two-way linked lists as transaction details age within the system and/or are discarded from the system after a period of time.

In some embodiments, the system is configured to automatically spawn compromise portfolio profiles for detailed analytics of the behavior of the compromised cards as a group. The system may also be configured to generate card-level models of suspected counterfeit and CNP/MOTO (Card Not Present/Mail Order—Telephone Order) fraud for those cards associated with a compromise cluster and those cards not associated with a compromise cluster. The system may further be configured to generate merchant-level models of risky behavior and suspected test-site utilization by fraudsters, and generate compromise portfolio profiles monitoring the activity (or lack of activity) of the suspected mass compromise or point of compromise to produce a compromise score.

For purposes of this document and in the context of the disclosed embodiments, the term "point of compromise" relates to a specific time period during which a card or set of cards is used and compromised at a particular merchant. Counterfeit cards created during a point of compromise may later be used illegitimately and detected by a fraud detection system. The term "mass compromise" relates to a point in time where card information is stolen from a merchant/data aggregator, typically accessed from a database, but the actual date on which the cards are used at a merchant or entered into a financial information database could be any date prior to the time of mass compromise. Mass compromise cards are typically utilized in CNP/MOTO fraud transactions, since a physical representation of the card, such as information on the magnetic stripe, is not typically obtained.

In accordance with some embodiments, a system or method to detect mass compromise and point of compromise is configured to generate and store a transaction history. The transaction history is stored so that a pre-fraud pattern can be computed to detect potential points of compromise and mass compromise when a given card is later designated as fraudulent, i.e. detected as fraudulent via one or more models, or reported or confirmed as fraudulent. The transaction history is also needed when a compromise cluster of compromised cards is to be constructed as based on suspected pre-fraud rate or excessive testing at test sites.

For detecting and managing compromise, the system utilizes five different types of profiles, described below:

Card Holder Profile: Keyed by account number, this profile includes a primary Compromise Card Global Profile Index (CCGP_index) key to a Compromise Card Global Profile, and includes predictive variables indicative of CNP/MOTO and counterfeit fraud.

Compromise Card Global Profile: Keyed by the CCGP_index, this profile includes transaction arrays that maintain a history of date/times and merchants where the card transacted.

Merchant Profile: Keyed by a merchant identifier this profile includes a primary Compromise Merchant Global Profile Index (CMGP_index) key to a Compromise Merchant Global Profile and merchant fraud detection variables and test site detection variables.

Compromise Merchant Global Profile: Keyed by CMGP_index, this profile includes an array indexed by time that includes a number of cards, a number of counterfeit and/or fraudulent cards, a number of CNP/MOTO frauds, and a number of card-level model suspected fraud cases associated with cards that have transacted at the merchant in the past.

Compromised Portfolio Profile: Includes statistical and analytic pattern detection variables for the group of cards suspected to be part of a particular mass compromise or point of compromise. The portfolio will be monitored for changes in the activity of cards indicative of increased portfolio risk and allow for decisions related to reissue or more sensitive monitoring of cards. This profile monitors all the associated compromised cards for test-site polling, compromise cluster sequential transacting, and abnormal clustering of usage across cards in the cluster.

A skeleton structure of the profiles is described below. The profiles allow for the proper detection of potential compromise, generation of the compromise card clusters, and generation of model scores at the card, merchant, and compromise levels to allow for better monitoring and management of compromised cards.

As exemplified in FIG. 1, a Card Holder Profile 100 is indexed in a shared memory based on an account number in the authorization feed. The card holder profile 100 includes a combination of analytic variables pointing to suspicious CNP/MOTO and suspicious counterfeit behavior, as well as tag variables that indicate confirmed fraud reported on the card. The card holder profile 100, in addition to providing card-level fraud detection, also includes one or more links to the CCGP_index. Using the card holder profile 100, a model fraud score is produced which indicates whether the card is likely to become a counterfeit or CNP/MOTO fraud based on the card-level variables and compromise cluster variables (if available). If the card is determined to be associated with a mass compromise or point of compromise, then the card-level fraud score will incorporate behavior associated with a Compromise Cluster(s) index (CC_index).

As exemplified in FIG. 2, a Compromise Card Global Profile is keyed in shared memory based on the CCGP index included in the card holder profile. Within this profile there is a multi-element array based on:

CMGP_index (identifies the merchant)
Date/Time
Previous CCGP_index at the merchant (identifies the previous card at the merchant)
Future CCGP_index at the merchant (identifies the future card at the merchant)

The previous CCGP_index and Future CCGP_index constitute a two-way linked list across the cards that transacted at the merchant which are used to create the Compromise Portfolio profile if a compromise is detected.

If the card is determined to be fraudulent, either through card-level fraud models within the system or through fraud reporting, the array of the card's transaction history will allow the system to retrieve the profiles of all visited merchants to indicate the time when the now fraudulent card was used at the merchant. This generates an accurate pre-fraud pattern which is updated and computed for each of the impacted merchants.

As exemplified in FIG. 3, the Merchant Profile is indexed based on a predefined merchant key. The profile includes a link between a physical MerchantID based on an AUTH transaction and an internally-represented CMGP_index profile. The merchant profile includes merchant-level fraud detection variables.

As shown in FIG. 4, the Compromise Merchant Global Profile is indexed in shared memory based on the CMGP index included in the Merchant Profile and accessed when an AUTH or FRAUD record is received, or when a suspected fraud is detected. In some embodiments, this profile includes six arrays indexed by time. The arrays track a total number of cards that transacted at the merchant, a number of confirmed/suspected counterfeit cards, a number of confirmed/suspected CNP/MOTO frauds, an amount of testing if the merchant is a test site, and the last CCGP_index to update the merchant.

Accordingly, based on predictive fraud variables in the merchant profile a score is generated indicative that a merchant during a time period has been compromised or was used in the testing of compromised devices. Further, based on a two-way linked list using the compromise device global profile, all devices that transacted at that merchant can be associated with a single compromise cluster profile index. When subsequent transactions come in for devices associated with a compromise cluster profile index, the cluster profile is retrieved and predictive fraud variables associated with the multiplicity of cards are updated.

The compromise cluster predictive variables are used to understand the activity of the compromised devices in the cluster indicative of potential aggregate fraudulent activity associated with the multiplicity of compromised devices. When a compromised device receives an authorization request predictive variables from both the device profile and the compromise cluster will be used to determine a device specific probability of fraud for each compromised device in the cluster allowing the compromised devices to be ranked in terms of the probability of future fraudulent activity occurring on the compromised device.

As exemplified in FIG. 5, the Compromise Portfolio Profile is indexed in the shared memory according to the Compromise Portfolio index included in the card profile of the current AUTH being processes. This index is assigned based on a counter of Compromise instances in the shared memory and cards will be assigned based on using the two-way linked list across card profiles to assign the appropriate Compromise Portfolio index to the card profiles. Once cards are associated with a compromise cluster, the compromise cluster is retrieved for each transaction associated with any of the cards in the compromise cluster.

The compromise Portfolio generates a score that will determine a severity of the compromise and the compromised card activity of the suspected compromise. This model will produce a merchant-level compromise score, whereas individual card scores will be produced based both on variables in the compromise cluster profile and the card profile.

The following describes a model work-flow:

AUTH Feed (Authorization feed)

Initialization: When the auth feed comes into the system, the record includes the keys to both the cardholder profile and the merchant profile. If either the merchant profile or cardholder profile is not created, these will be initialized. As part of initialization, a CMGP index is assigned to the Merchant profile and a CCGP index is assigned to the card profile. The account number and merchant will then be assigned to the similarly created and initialized CCGP and CMGP profiles, which links the internal keys for card and merchant to the physical keys derived from the AUTH transaction. The available CCGP and CMGP indexes are incremented by one.

Steady State: Within the Compromise Card Global profile, the first available or oldest (when aging transactions) CMGP index/date-time is replaced by the CMGP index contained within the Merchant profile associated with the current AUTH transaction. The CMGP index is determined from the Merchant profile that is retrieved based on the AUTH transaction. If the current AUTH is a first transaction for that card at the merchant on a particular date, then the card count on that date will be incremented. The transaction is stored in the card-level global profile and the Merchant global profile contains a history of the unique number of cards and their subsequent activity after they transacted on that date.

Any suspicious variables at the cardholder and merchant profile will be updated, and if the behavior is deemed suspicious, then a suspected fraud notification is produced Suspected Fraud Notification or Confirmed Fraud Notification Steady State: When a suspected fraud is determined or when a confirmed fraud notification is reported to the system, the account number in the fraud record (if a suspected fraud is determined the correct cardholder profile will already be loaded) is used to access the cardholder profile, and consequently the CCGP profile. If the card is determined to be counterfeit or CNP/MOTO fraud, then the merchant transaction history (indexed by CMGPs) included in the CCGP profile is used to update the fraud card count in the associated Compromise Merchant Global Profiles. After all the previously-visited merchants are updated, a pre-fraud rate pattern is computed for each merchant to determine whether there is suspicion of compromise based on a pre-fraud rate and additional fraud detection predictive recursive variables. Determination of points of compromise or mass compromise is determined through a variety of statistical, distance, and mutual information measures.

Initialization: If a compromise is detected, then the Last CCGP index is used to move through the indexed linked list of CCGP profiles to update the card profiles with the associated compromise cluster number. The compromise cluster is created and summary statistics are collected on the linked-list of cards.

When a new transaction comes in for one of the cards associated with the compromise cluster, then the Compromise Portfolio Profile is retrieved and the compromise portfolio can then be monitored for changes in the compromised cards portfolio behavior. Additionally, the card-level fraud scores utilize both card-level variables and compromise-level variables to ascertain the risk of the card being compromised and used fraudulently.

Maintaining Two-Way Linked Lists

The Compromise detection system makes use of two-way linked lists to allow for the creation of compromise clusters consisting of cards associated with the compromise. Two-way linked lists are maintained at the daily and weekly level. In some exemplary embodiments, the system can be configured for six months of daily monitoring and two years of weekly monitoring.

The properties of these linked lists will now be described with reference to FIGS. 6A-E.

Update Building the Linked List and Moving Back Through the List.

As illustrated in FIG. 6A, when the first transaction for a merchant/date is updated there is no previous transaction at the merchant so the Last CCGP_index is set to NONE. The Future CCGP_index is not yet known so it is also marked as NONE.

As illustrated in FIG. 6B, when the second transaction for a merchant/date is updated, then the Future CCGP_index can be updated in the previous card profile. The last CCGP_index in the profile of the card associated with the current transaction is set the previous card number. FIG. 6C illustrates a third transaction.

If a compromise occurred at Merchant #34138 the entry in the last CCGP_index will be used to access profiles, #88129219, #44312231, and #121321. As we retrieve and work through the linked list, when LAST CCGP_index=NONE the entire linked-list has been processed.

Repair of the Two-Way Linked List

Given that the linked lists are performed at the transaction level, at some point the transaction may be discarded due to finite transaction storage for a particular card. In this situation, prior to deletion or "aging off" of the transaction from the transaction history of the card, the linked list needs to be repaired or it will be broken. This is illustrated in FIGS. 6D and 6E, as the future and last CCGP_indexes of the card transaction that proceeds and follows the transaction to be deleted are readjusted.

Some embodiments can be implemented in digital electronic circuitry, or in computer hardware, firmware, software, or in combinations of them. Some embodiments can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Methods can be performed by one or more programmable processors executing a computer program to perform functions of the invention by operating on input data and generating output. Method can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

Although a few embodiments have been described in detail above, other modifications are possible. Other embodiments may be within the scope of the following claims.

The invention claimed is:

1. A computer-implemented method comprising:
   detecting, by one or more computer processors, compromised plurality of financial transaction devices;
   defining, by the one or more computer processors, a compromise cluster from the compromised plurality of financial transaction devices;
   forming, by the one or more computer processors, a device holder profile and a merchant profile for each of the plurality of financial transaction devices that define the compromise cluster, the device holder profile including device-level predictive variables indicative of fraud, and the merchant profile including merchant fraud detection variables indicative of fraud;
   forming, by the one or more computer processors, a compromise device global profile based on the compromise cluster and keyed from the device holder profile, the compromise device global profile including transaction arrays based on a transaction history for each of the plurality of financial transaction devices indicative of fraud patterns across and between each of the compromised plurality of financial transaction devices associated with the compromise cluster;
   forming, by the one or more computer processors, a compromised portfolio profile indexed with the compromise cluster based on two-way linked lists across device holder profiles, the compromised portfolio profile including compromise-level predictive variable indicative of a severity of the detected compromise;
   forming, by the one or more computer processors, a compromise merchant global profile based on the compromise cluster and keyed from the merchant profile, the compromise merchant global profile including a number of time-indexed arrays comprising a number of financial transaction devices, and fraud cases thereof, that have transacted with the merchant; and
   generating, by the one or more computer processors, a fraud score based on the compromise-level predictive variables and device-level predictive variables, the fraud score representing a likelihood that any one financial transaction device of the compromise cluster will be used fraudulently based on real-time transaction data related to the one financial transaction device and to the plurality of financial transaction devices of the compromise cluster.

2. The computer implemented method in accordance with claim 1, wherein the compromise-level predictive variables of the compromise portfolio profile include compromise cluster variables indicative of a mass compromise of the compromised plurality of financial transaction devices.

3. The computer implemented method in accordance with claim 1, further comprising combining, by the one or more computer processors, the device-level predictive variables with the compromise cluster variables to determine whether each financial transaction device is associated with the mass compromise and will be used fraudulently.

4. The computer implemented method in accordance with claim 1, wherein the transaction arrays maintain a history of time and location information where each financial transaction device was used.

5. The computer implemented method in accordance with claim 1, wherein the merchant profile further includes a merchant identifier associated with the merchant, and a compromise merchant global profile index key to the compromise merchant global profile.

6. The computer implemented method in accordance with claim 5, wherein the time-indexed arrays include a number of financial transaction devices, a number of fraudulent financial transaction devices, and a number of cases of counterfeit and MOTO fraud devices associated with the merchant.

7. The computer implemented method in accordance with claim 1, further comprising detecting, by the one or more processors and using the compromise merchant global profile, patterns associated with the number of financial transaction devices that previously transacted at the merchant based on pre-fraud patterns that are anomalous and indicative of potential compromise.

8. A computer program product comprising:
   a non-transient storage medium readable by at least one processor and storing instructions for execution by the at least one processor for:
   detecting compromised plurality of financial transaction devices; defining a compromise cluster from the compromised plurality of financial transaction devices;
   forming a device holder profile and a merchant profile for each of the plurality of financial transaction devices that define the compromise cluster, the device holder profile including device-level predictive variables indicative of fraud, and the merchant profile including merchant fraud detection variables indicative of fraud;
   forming a compromise device global profile based on the compromise cluster and keyed from the device holder profile, the compromise device global profile including transaction arrays based on a transaction history for each of the plurality of financial transaction devices indicative of fraud patterns across and between each of the compromised plurality of financial transaction devices associated with the compromise cluster;
   forming a compromised portfolio profile indexed with the compromise cluster based on two-way linked lists across device holder profiles, the compromised portfolio profile including compromise-level predictive variable indicative of a severity of the detected compromise;
   forming, by the one or more computer processors, a compromise merchant global profile based on the compromise cluster and keyed from the merchant profile, the compromise merchant global profile including a number of time-indexed arrays comprising a number of financial transaction devices, and fraud cases thereof, that have transacted with the merchant; and
   generating a fraud score based on the compromise-level predictive variables and device-level predictive variables, the fraud score representing a likelihood that any one financial transaction device of the compromise cluster will be used fraudulently based on real-time transaction data related to the one financial transaction device and to the plurality of financial transaction devices of the compromise cluster.

9. The computer program product in accordance with claim 8, wherein the compromise-level predictive variables of the compromise portfolio profile include compromise cluster variables indicative of a mass compromise of the compromised plurality of financial transaction devices.

10. The computer program product in accordance with claim 8, the instructions further comprising instructions for combining the device-level predictive variables with the compromise cluster variables to determine whether each financial transaction device is associated with the mass compromise and will be used fraudulently.

11. The computer program product in accordance with claim 8, wherein the transaction arrays maintain a history of time and location information where each financial transaction device was used.

12. The computer program product in accordance with claim 8, wherein the merchant profile further includes a merchant identifier associated with the merchant, and a compromise merchant global profile index key to the compromise merchant global profile.

13. The computer program product in accordance with claim 12, wherein the time-indexed arrays include a number of financial transaction devices, a number of fraudulent financial transaction devices, and a number of cases of counterfeit and MOTO fraud devices associated with the merchant.

14. The computer program product in accordance with claim 8, the instructions further comprising instructions for detecting, using the compromise merchant global profile, patterns associated with the number of financial transaction devices that previously transacted at the merchant based on pre-fraud patterns that are anomalous and indicative of potential compromise.

15. A system for managing compromise of financial transaction devices, each financial transaction device having a transaction history, the system comprising:
   a computing system maintaining a two-way communication link with a plurality of merchants that use the financial transaction devices, the computing system being configured to execute a plurality of computer programs stored on a non-transient storage device, the plurality of computer programs comprising:
   a first computer program module that defines a compromise cluster from a subset of the financial transaction devices that have been compromised;
   a second computer program module that generates a compromise device global profile associated with the transaction history, the device global profile including compromise-level predictive variables indicative of fraud patterns across and between each of the plurality of financial transaction devices associated with the compromise cluster, the compromise-level predictive variables comprising compromise cluster variables relating to unique behavior of each of the plurality of financial transaction devices of the compromise cluster, and indicators that at least one of the plurality of financial transaction devices of the compromise cluster are being used fraudulently;
   a third computer program module that generates a device profile based on a transaction history for each of the plurality of financial transaction devices, the device profile including device-level predictive variables indicative of fraud and device-testing behaviors associated with each financial transaction device, and further generates a compromise device global profile linked with the device profile that includes transaction arrays that maintain a history of date/times and merchants where the financial transaction device transacted;
   a fourth computer program that forms a compromise merchant global profile based on the compromise cluster and keyed from the merchant profile, the compromise merchant global profile includina a number of time-indexed arrays comprising a number of financial transaction devices, and fraud cases thereof, that have transacted with the merchant; and
   a fifth computer program module that generates a fraud score based on the compromise-level predictive variables and device-level predictive variables, the fraud score representing a likelihood that any one financial transaction device of the compromise cluster will be used fraudulently based on real-time transaction data related to the one financial transaction device and to the plurality of financial transaction devices of the compromise cluster.

16. A system in accordance with claim 15, wherein the compromise device global profile includes transaction arrays stored on the storage device that maintain a history of time and location information where the financial transaction device was used.

17. A system in accordance with claim 16, further comprising a third computer program module that generates a merchant profile, the merchant profile including merchant fraud detection variables indicative of fraud and compromise device testing associated with the merchant.

18. A system in accordance with claim 17, wherein the merchant profile further includes a merchant identifier associated with the first merchant, and a primary compromise merchant global profile index key to a compromise merchant global profile.

* * * * *